United States Patent Office 2,697,707
Patented Dec. 21, 1954

2,697,707

PROCESS OF PRODUCING CYANINE DYESTUFFS

John David Kendall, Harold Gordon Suggate, and John Henry Mayo, Ilford, England, assignors to Ilford Limited, Ilford, England, a British company No Drawing. Application November 26, 1951, Serial No. 258,304

Claims priority, application Great Britain December 5, 1950

3 Claims. (Cl. 260—240)

This invention relates to the production of dyestuffs which have utility as optical sensitisers for photographic emulsions.

According to the present invention dyestuffs having utility as optical sensitisers for photographic emulsions have the general Formula I:

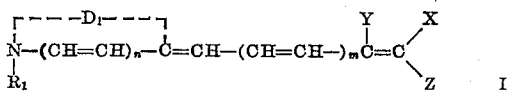

where $D_1$ is the residue of a 5-membered or 6-membered heterocyclic nitrogen nucleus, $R_1$ is an alkyl or aralkyl group, Y is an alkyl, aralkyl, aryl or heterocyclic group, X is a nitrile group, Z is a nitrile group or an esterified carboxylic acid group, and $n$ and $m$ are the same or different and are each nought or 1.

According further to the present invention the said dyestuffs are produced by condensing an intermediate of general Formula II:

where $R_2$ is a hydrogen or hydrocarbon group (preferably lower alkyl), or where $R_2CH_2$ and Y together form an isocyclic ring, e. g. cyclohexanone or cyclopentanone, and otherwise Y, X and Z have the meanings assigned to them above, with a compound of general formula:

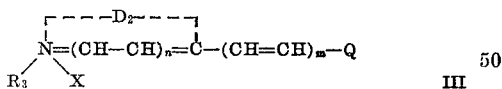

where Q is an alkyl thioether group or an $NHR_4$ group where $R_4$ is aryl or acylaryl residue, $R_3$ is an alkyl or aralkyl group, X is an acid residue, $D_2$ is the residue of a 5-membered or 6-membered heterocyclic nitrogen ring, and $n$ and $m$ are the same or different and each is nought or 1. The $CH_2$ group of the $R_2CH_2$ grouping is reactive and one of its hydrogen atoms splits out with the radicle Q to yield a dyestuff of the general Formula I.

The intermediate of general Formula II may be made by the method of Widequist, Acta Chem. Scand., 3, 303/304, 1949; Chem. Abs., 43, 7901h, 1949.

In carrying out the reaction the preferred procedure is to dissolve equimolecular quantities of the intermediates in alcohol, add one molecular equivalent of an acid binding agent, e. g. triethylamine, and gently reflux the mixture for about half an hour. On cooling the mixture and diluting with water the required dyestuff usually separates. Instead of triethylamine there may be employed: sodium acetate, potassium carbonate, sodium chloride, pyridine or caustic soda.

It might reasonably have been expected that when Y is a methyl or other lower alkyl group it might also be reactive so that reaction would occur both on the Y group and the $R_2CH_2$ group, but in fact no clear evidence of such a reaction has been found.

Where any of the symbols in the formulae given above may represent alkyl groups these may be methyl, ethyl, propyl, butyl or higher alkyl. Where any of them represent aralkyl groups these may be, for example, benzyl groups, and where any of them represent aryl groups these may be, for example, phenyl or naphthyl groups.

The residues $D_1$ and $D_2$ may be the residues of any 5-membered or 6-membered heterocyclic nitrogen nucleus commonly employed in cyanine dyes, e. g. thiazoles, oxazoles, selenazoles and their polycyclic homologues, such as those of the benzene, naphthalene, acenaphthene and anthracene series, pyridine and its polycyclic homologues such as quinoline and α and β naphthoquinolines, lepidines, indolenines, diazines such as pyrimidines and quinazolines, diazoles such as thio-ββ'-diazole, oxazolines, thiazolines and selenazolines. The polycyclic compounds of these series may be substituted in the carbocyclic rings by one or more groups such as alkyl, aryl, amino, hydroxy, alkoxy and methylene-dioxy groups or by halogen atoms.

The following examples will serve to illustrate the invention:

EXAMPLE 1

Preparation of methylisopropylidene cyanoacetate

Methyl cyanoacetate (37.25 gms.) was added to chloroform (37.5 cc.), acetone (28 gms.), ammonium acetate (3 gms.) and acetic acid (4.5 cc.) and the mixture boiled gently under reflux for 2 hours, using an extractor from which the water split out in the reaction was removed manually at intervals of about 15 minutes. The mixture was cooled, washed with water and the chloroform solution dried over sodium sulphate. The chloroform was distilled off and the residual oil distilled in vacuo. The product, obtained as a colourless oil, had B. P. 96–97° C. at 3 mm. pressure.

EXAMPLE 2

Preparation of 2-cyano-3-ethyl-2-pentenonitrile

Malononitrile (20 gms.) was added to diethyl ketone (30 gms.), chloroform (40 cc.), ammonium acetate (2.5 gms.) and glacial acetic acid (4 cc.) and the mixture boiled gently under reflux for 2½ hours using an extractor from which the water split out during the reaction was removed manually at intervals of about 15 minutes. The mixture was cooled and the chloroform solution washed with water and dried over sodium sulphate. The chloroform was distilled off and the residual oil distilled in vacuo. The product, obtained as a pale yellow oil, had B. P. 105° C. at 8 mm. pressure.

EXAMPLE 3

Ethyl-6-(-3-ethyl-2:3-dihydrobenzthiazolylidene-2-)-3-methyl-2-cyano-2:4-hexadienoate 2-ω-acetanilidovinylbenzthiazole ethiodide (2.245 gms.; .005 mol.) was boiled gently under reflux in ethyl alcohol (20 cc.) with ethyl isopropylidenecyanoacetate (.765 gms.; .005 mol.) and triethylamine (.75 cc.; .005 mol.) for 20 minutes giving a deep red/mauve solution. On cooling and dilution dark mauve crystals separated. M. Pt. 193° C.

The crystals were extracted with benzene in a Soxhlett extractor and the benzene solution concentrated under reduced pressure to about 15 ccs. Dilution with light petroleum ether gave crystals, M. Pt. 198° C.

Crystallisation from ethyl alcohol gave dark blue crystals, M. Pt. 199° C.

This dyestuff, when incorporated in a silver iodobromide emulsion, extended the sensitivity to about 6400 Å. with indeterminate maxima at 5400 Å. and 5900 Å.

EXAMPLE 4

Ethyl-4-(3-methyl-2:3-dihydrobenzthiazolylidene-2-)-3-methyl-2-cyano-2-butenoate 2-methylthiobenzthiazole (.905 gms.; .005 mol.) was fused with methyl toluene-p-sulphonate (.93 gms.; .005 mol.) for 4 hours at 120° C. Ethyl alcohol (20 cc.), ethyl isopropylidenecyanoacetate (.765 gms.; .005 mol.) and triethylamine (.75 cc.; .005 mol.) were added and the mixture boiled gently under reflux for 20 minutes giving a yellow solution. On cooling and dilution yellow crystals separated. M. Pt. 200° C. Recrystallisation from ethyl alcohol gave yellow crystals, M. Pt. 204° C.

This dyestuff, when incorporated in a silver chloride emulsion, extended the sensitivity to about 4950 Å. with maximum at about 4400 Å. and 4650 Å.

EXAMPLE 5

*Ethyl-10-(-3-ethyl - 2:3 - dihydrobenzthiazolylidene-2-)-3-methyl-2-cyano-2:4:6:8-decatetraenoate*

2-ω-acetanilidohexatrienylbenzthiazole ethiodide (1.45 gms.; .0025 mol.) was boiled gently under reflux in ethyl alcohol (50 cc.) with ethyl isopropylidenecyanoacetate (.383 gm.; 0025 mol.) and triethylamine (.37 cc.; .0025 mol.) for 20 minutes giving a deep blue solution. On cooling and dilution blue/black crystals separated, M. Pt. 147° C.

The crystals were extracted with benzene in a Soxhlett extractor and the benzene solution concentrated under reduced pressure to about 15 ccs. Dilution with light petroleum ether gave black crystals, M. Pt. 151° C.

Crystallisation from ethyl alcohol gave blue/black crystals, M. Pt. 153° C.

This dyestuff, when incorporated in a silver iodobromide emulsion, extended the sensitivity from 5900 Å. to about 7300 Å. with maximum at about 6800 Å.

EXAMPLE 6

*4-(3-methyl-2:3-dihydrobenzthiazolylidene-2-)-3 - methyl-2-cyano-2-butenonitrile*

2-methylthiobenzthiazole (.905 gm.; .005 mol.) was fused with methyl toluene-p-sulphonate (.93 gm.; .005 mol.) for 4 hours at 120° C. Ethyl alcohol (20 cc.), isopropylidenemalononitrile (.53 gm.; .005 mol.) and triethylamine (.75 cc.; .005 mol.) were added and the mixture boiled gently under reflux for 20 minutes giving a yellow solution. On cooling and dilution orange crystals separated, M. Pt. 284° C. Recrystallisation from ethyl alcohol gave orange crystals, M. Pt. 288° C.

This dyestuff, when incorporated in a silver chloride emulsion, extended the sensitivity from 4200 Å. to 5000 Å. with maximum at about 4900 Å.

The following are further examples of intermediates prepared by processes strictly analogous to those set forth in Examples 1 and 2.

FROM ETHYL CYANOACETATE

| Example No. | Ketone used | $R_2$ | Y | X | Z | M. P. or B. P. ° C. |
|---|---|---|---|---|---|---|
| 7 | Acetone | H | $CH_3$ | CN | $COOC_2H_5$ | B. P. 98–9° C. at 1 mm. |
| 8 | Methyl Ethyl | $CH_3$ | $CH_3$ | CN | $COOC_2H_5$ | B. P. 112° C. at 8 mm. |
| 9 | Diethyl | $CH_3$ | $C_2H_5$ | CN | $COOC_2H_5$ | B. P. 114° C. at 6 mm. |
| 10 | Acetophenone | H | $C_6H_5$ | CN | $COOC_2H_5$ | B. P. 178–9° C. at 8 mm. |
| 11 | Propiophenone | $CH_3$ | $C_6H_5$ | CN | $COOC_2H_5$ | B. P. 164–5° C. at 6 mm. |
| 12 | Cyclopentanone | —$(CH_2)_4$— | | CN | $COOC_2H_5$ | M. P. 58° C. |
| 13 | Cyclohexanone | —$(CH_2)_5$— | | CN | $COOC_2H_5$ | B. P. 148–9° C. at 8 mm. |
| 14 | Mesityl Oxide | H | CH=C(CH$_3$)$_2$ | CN | $COOC_2H_5$ | B. P. 138–140° C. at 10 mm. |

FROM METHYL CYANOACETATE

| Example No. | Ketone used | $R_2$ | Y | X | Z | M. P. or B. P. ° C. |
|---|---|---|---|---|---|---|
| 15 | 2-Acetyl Thiophene | H | (2-thienyl) | CN | $COOCH_3$ | M. P. 70° C. |

FROM MALONONITRILE

| Example No. | Ketone used | $R_2$ | Y | X | Z | M. P. or B. P. ° C. |
|---|---|---|---|---|---|---|
| 16 | Acetone | H | $CH_3$ | CN | CN | B. P. 91° C. at 3.5 mm. |
| 17 | Ethyl methyl | $CH_3$ | $CH_3$ | CN | CN | B. P. 102° C. at 8 mm. |
| 18 | Benzyl methyl | $C_6H_5$ | $CH_3$ | CN | CN | B. P. 174–5° C. at 10 mm. |

The following are further examples of dyestuffs prepared by processes strictly analogous to those set forth in the foregoing Examples 3 to 6 inclusive.

In the final column of these tables the symbol Cl or IBr denotes whether the test was made in silver chloride or silver iodobromide emulsion, the symbol E denotes the limit of sensitivity imparted by the dye, and the symbol M denotes the region of maximum sensitivity imparted by the dye.

FROM METHYL ISOPROPYLIDENE CYANOACETATE (B. P. 96–7° C. AT 3 MM.)

| Example No. | Nucleus of which $D_1$ is residue | $R_1$ | $n$ | $m$ | X | Y | Z | M. P., ° C. | Sensitising Data |
|---|---|---|---|---|---|---|---|---|---|
| 19 | Benzthiazole | $CH_3$ | 0 | 0 | CN | $CH_3$ | $COOCH_3$ | 224 | Cl. E. 4,950 Å. M. 4,300 Å. and 4,655 Å. |
| 20 | do | $C_2H_5$ | 0 | 0 | CN | $CH_3$ | $COOCH_3$ | 216 | Cl. E. 5,100 Å. M. 4,300 Å. and 4,700 Å. |
| 21 | Quinoline | $CH_3$ | 0 | 0 | CN | $CH_3$ | $COOCH_3$ | 176 | Cl. E. 5,600 Å. M. 4,950 Å. and 5,400 Å. |
| 22 | β-Naphthathiazole | $CH_3$ | 0 | 0 | CN | $CH_3$ | $COOCH_3$ | 233 | Cl. E. 5,000 Å. M. 4,800 Å. |

FROM ETHYL ISOPROPYLIDENE CYANACETATE (B. P. 98–99° C. AT 1 MM.)

| Example No. | Nucleus of which $D_1$ is residue | $R_1$ | $n$ | $m$ | X | Y | Z | M. P., °C. | Sensitising Data |
|---|---|---|---|---|---|---|---|---|---|
| 23 | Benzthiazole | $C_2H_5$ | 0 | 0 | CN | $CH_3$ | $COOC_2H_5$ | 164 | Cl. E. 4,950 Å. M. 4,400 Å. and 4,700 Å. |
| 24 | Quinoline | $CH_3$ | 0 | 0 | CN | $CH_3$ | $COOC_2H_5$ | 127 | IBr. E. 5,900 Å. M. 5,500 Å. |
| 25 | β-Napthathiazole | $CH_3$ | 0 | 0 | CN | $CH_3$ | $COOC_2H_5$ | 215 | Cl. E. 5,100 Å. M. 4,600 Å. and 4,800 Å. |
| 26 | Benzoxazole | $CH_3$ | 0 | 1 | CN | $CH_3$ | $COOC_2H_5$ | 154 | Cl. E. 5,850 Å. M. 4,600 Å., 4,800 Å. and 5,400 Å. |
| 27 | Quinoline | $CH_3$ | 1 | 1 | CN | $CH_3$ | $COOC_2H_5$ | 187 | IBr. E. 8,600 Å. M. 8,000 Å. |
| 28 | 3:3-Dimethyl indolenine | $CH_3$ | 0 | 1 | CN | $CH_3$ | $COOC_2H_5$ | 238 | IBr. E. 5,300 Å. |
| 29 | 5.6-Dimethoxy benzthiazole | $CH_3$ | 0 | 0 | CN | $CH_3$ | $COOC_2H_5$ | 230 | Cl. E. 4,950 Å. M. 4,400 Å. and 4,300 Å. |
| 30 | 6-Methyl benzoxazole | $CH_3$ | 0 | 0 | CN | $CH_3$ | $COOC_2H_5$ | 181 | Cl. E. 4,550 Å. M. 4,350 Å. |
| 31 | β-Naphthathiazole | $CH_3$ | 0 | 1 | CN | $CH_3$ | $COOC_2H_5$ | 254 | IBr. E. 5,200 Å. M. 4,650 Å. |

FROM ETHYL 2-BUTYLIDENE CYANOACETATE (B. P. 112° C. AT 8 MM.)

| Example No. | Nucleus of which $D_1$ is residue | $R_1$ | $n$ | $m$ | X | Y | Z | M. P., °C. | Sensitising Data |
|---|---|---|---|---|---|---|---|---|---|
| 32 | Benzthiazole | $CH_3$ | 0 | 0 | CN | $C_2H_5$ | $COOC_2H_5$ | 155 | Cl. E. 4,950 Å. M. 4,700 Å. |
| 33 | do | $C_2H_5$ | 0 | 0 | CN | $C_2H_5$ | $COOC_2H_5$ | 127 | Cl. E. 5,000 Å. M. 4,400 Å. and 4,750 Å. |
| 34 | Benzoxazole | $CH_3$ | 0 | 0 | CN | $C_2H_5$ | $COOC_2H_5$ | 121 | Cl. E. 5,050 Å. M. 4,400 Å. and 4,700 Å. |
| 35 | β-Naphthathiazole | $CH_3$ | 0 | 0 | OH | $C_2H_5$ | $COOC_2H_5$ | 232 | Cl. E. 5,350 Å. M. 4,500 Å. and 4,900 Å. |

FROM ETHYL 2-CYANO-3:5-DIMETHYL-2:4-HEXADIENOATE (B. P. 138–140° C. AT 10 MM.)

| Example No. | Nucleus of which $D_1$ is residue | $R_1$ | $n$ | $m$ | X | Y | Z | M. P., °C. | Sensitising Data |
|---|---|---|---|---|---|---|---|---|---|
| 36 | β-Naphthathiazole | $CH_3$ | 0 | 0 | CN | $CH=C(CH_3)CH_3$ | $COOC_2H_5$ | 213 | Cl. E. 5,100 Å. M. 4,850 Å. |

FROM ETHYL-2-CYANO-3-PHENYL-2-BUTENOATE (B. P. 178–179° C. AT 8 MM.)

| Example No. | Nucleus of which $D_1$ is residue | $R_1$ | $n$ | $m$ | X | Y | Z | M. P., °C. | Sensitising Data |
|---|---|---|---|---|---|---|---|---|---|
| 37 | Benzthiazole | $CH_3$ | 0 | 0 | CN | $C_6H_5$ | $COOC_2H_5$ | 177 | Cl. E. 4,950 Å. M. 4,700 Å. |
| 38 | Quinoline | $CH_3$ | 0 | 0 | CN | $C_6H_5$ | $COOC_2H_5$ | 198 | IBr. E. 5,050 Å. M. 4,630 Å. |
| 39 | Benzoxazole | $CH_3$ | 0 | 1 | CN | $C_6H_5$ | $COOC_2H_5$ | 243 | IBr. E. 6,150 Å. M. 4,800 Å. and 5,800 Å. |
| 40 | β-Naphthathiazole | $CH_3$ | 0 | 0 | CN | $C_6H_5$ | $COOC_2H_5$ | 238 | E. 5,300 Å. M. 4,950 Å. |

FROM ETHYL-2-CYANO-3-BENZYL-2-BUTENONITRILE (B. P. 174–5° C. AT 10 MM.)

| Example No. | Nucleus of which $D_1$ is residue | $R_1$ | $n$ | $m$ | X | Y | Z | M. P., °C. | Sensitising Data |
|---|---|---|---|---|---|---|---|---|---|
| 41 | Benzthiazole | $CH_3$ | 0 | 0 | CN | $CH_2C_6H_5$ | CN | 217 | IBr. E. 5,300 Å. M. 4,600 Å. |

FROM METHYL-2-CYANO-3-THIENYL-2-BUTENOATE (M. P. 70° C.)

| Example No. | Nucleus of which $D_1$ is residue | $R_1$ | $n$ | $W$ | — | Y | Z | M. P., °C. | Sensitising Data |
|---|---|---|---|---|---|---|---|---|---|
| 42 | β-Naphthathiazole | $CH_3$ | 0 | 0 | CN | (thienyl) | $COOCH_3$ | 246 | Cl. E. 5,550 Å. M. 5,100 Å. |
| 43 | Benzthiazole | $CH_3$ | 0 | 1 | CN | (thienyl) | $COOCH_3$ | 191 | IBr. E. 6,850 Å. M. 6,150 Å. |
| 44 | Benzoxazole | $CH_3$ | 0 | 1 | CN | (thienyl) | $COOCH_3$ | 203 | IBr. E. 6,750 Å. M. 5,100 Å. |

FROM ISOPROPYLIDENE MALONONITRILE (B. P. 91° C. at 3.5 MM.)

| Example No. | Nucleus of which $D_1$ is residue | $R_1$ | $n$ | $W$ | — | Y | Z | M. P., °C. | Sensitising Data |
|---|---|---|---|---|---|---|---|---|---|
| 45 | Benzthiazole | $C_2H_5$ | 0 | 0 | CN | $CH_3$ | CN | 215 | Cl. E. 5,000 Å. M. 4,850 Å. |
| 46 | β-Naphthathiazole | $CH_3$ | 0 | 0 | CN | $CH_3$ | CN | 306 | Cl. E. 4,950 Å. M. 4,800 Å. |
| 47 | Quinoline | $CH_3$ | 0 | 0 | CN | $CH_3$ | CN | 256 | Cl. E. 5,800 Å. M. 5,600 Å. |
| 48 | Benzthiazole | $C_2H_5$ | 0 | 3 | CN | $CH_3$ | CN | 200 | IBr. E. 4,950 Å. M. 4,600 Å. |

FROM 2-CYANO-3-ETHYL-2-BUTENONITRILE (B. P 102° C. AT 8 MM.)

| Example No. | Nucleus of which $D_1$ is residue | $R_1$ | $n$ | $W$ | — | Y | Z | M. P., °C. | Sensitising Data |
|---|---|---|---|---|---|---|---|---|---|
| 49 | Benzthiazole | $CH_3$ | 0 | 0 | CN | $C_2H_5$ | CN | 227 | Cl. M. 4,700 Å. |
| 50 | Quinoline | $CH_3$ | 0 | 0 | CN | $C_2H_5$ | CN | 133 | IBr. E. 5,800 Å. M. 4,650 Å. and 5,650 Å. |
| 51 | Benzthiazole | $C_2H_5$ | 0 | 0 | CN | $C_2H_5$ | CN | 168 | IBr. E. 4,900 Å. M. 4,700 Å. |

EXAMPLE 52

*Ethyl-4-(-3-methyl-4:5-benz-2:3-dihydrobenzthiazolylidene-2-)-2-cyano-3:4-trimethylene-2-butenoate*

2-methylthio-β-naphthathiazole (1.15 gms.; .005 mol.) was fused with methyl p-toluene sulphonate (.93 gm.; .005 mol.) for 4 hours at 130° C. Ethyl alcohol (25 cc.), ethyl cyclopentylidene cyanoacetate (.895 gm.; .005 mol.) and triethylamine (.75 cc.; .005 mol.) were added and the mixture boiled gently under reflux for 20 minutes, giving a yellow solution. On cooling and dilution orange crystals separated, M. Pt. 243° C. Crystallisation from ethyl alcohol gave M. Pt. 246° C. Recrystallisation from ethyl alcohol gave orange crystals, M. Pt. 247° C.

This dyestuff, when incorporated in a silver chloride emulsion, extended the sensitivity to 5300 Å. with maximum at 5000 Å.

It is to be understood that this invention includes the new dyestuffs per se, their processes of production hereinbefore described, and photographic silver halide emulsions containing them.

What we claim is:

Process for the production of dyestuffs which comprises condensing a compound of the formula:

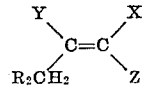

where X is a nitrile group, Y is a group selected from the class consisting of alkyl, benzyl, phenyl and thienyl groups and groups which with $R_2$ constitute an isocyclic ring selected from the group consisting of cyclopentanone and cyclohexanone rings, Z is a group selected from the class consisting of nitrile and esterified carboxyl groups, and $R_2$ is selected from the class consisting of the hydrogen atom, alkyl groups and groups which with Y constitute an isocyclic ring selected from the group consisting of cyclopentanone and cyclohexanone rings, with a compound of the formula:

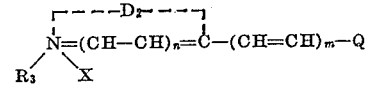

where Q is selected from the class consisting of alkyl thioether and acetanilido groups, $R_3$ is selected from the class consisting of alkyl and benzyl groups, X is an acid residue, $D_2$ is the radicle of a nucleus selected from the class consisting of 5-membered and 6-membered heterocyclic nuclei, $n$ is selected from nought and 1 and $m$ is selected from nought and 1.

2. Process according to claim 1 wherein the reaction is carried out in the presence of an acid binding agent.

3. Process according to claim 1 wherein the reaction is carried out by refluxing the reagents in alcoholic solution in the presence of triethylamine.

References Cited in the file of this patent
UNITED STATES PATENTS

| Number | Name | Date |
|---|---|---|
| 2,166,736 | White et al. | July 18, 1939 |
| 2,263,749 | White et al. | Nov. 25, 1941 |
| 2,320,654 | Riester | June 1, 1943 |
| 2,322,015 | Hamer et al. | June 15, 1943 |
| 2,338,782 | Riester | Jan. 11, 1944 |
| 2,340,882 | Kendall | Feb. 8, 1944 |
| 2,353,164 | Kendall et al. | July 11, 1944 |
| 2,511,210 | Kendall | June 13, 1950 |
| 2,573,555 | Edwards | Oct. 30, 1951 |
| 2,600,380 | Edwards | June 17, 1952 |
| 2,603,642 | Edwards | July 15, 1952 |
| 2,638,473 | Edwards | May 12, 1953 |

OTHER REFERENCES

Chem. Abstracts 16:3101 (Abstract of Brit. Med. Jour., 1922, I, 514–515).

Chem. Abstracts 19:530 (Abstracts of Proc. Roy. Soc., London, 96B, 317–333, 1924).